United States Patent Office 3,173,496
Patented Mar. 16, 1965

3,173,496
TRACTOR HITCH ARRANGEMENT
Robert B. Annat, Kenilworth, England, assignor to Massey-Ferguson (United Kingdom) Limited, London, England, a company of Great Britain
Filed May 1, 1962, Ser. No. 191,613
Claims priority, application Great Britain, May 3, 1961, 15,950/61
4 Claims. (Cl. 172—449)

This invention relates generally to tractor hitch arrangements and concerns, more particularly, a hitch for dividing the weight of an implement between the tractor and the implement support wheel or wheels.

In the well-known "Ferguson system" for mounting an implement on a tractor, the weight and "suck" of the implement is transferred to the tractor through a three-link hitch. The tractor itself may therefore be relatively light with no sacrifice in pulling power. However, when such a light tractor is called upon to draw a heavy wheeled implement, or a trailer whose weight is not transferred to the tractor, the lack of weight at the drive wheels causes wheel slippage and prevents the full power of the tractor from coming into play.

Accordingly, it is the primary aim of the invention to provide a tractor hitch arrangement which transfers a portion of the weight of an implement or trailer from its supporting wheels to the tractor. A collateral object is to provide a hitch of this type which permits the amount of weight transfer to be easily controlled.

A related object is to provide a hitch of the above character which retains the "Ferguson system" type of draft control while dividing the implement weight between the tractor and the implement wheel or wheels.

Another object is to provide a hitch as described above which is economical to manufacture and easy to use.

Other objects and advantages of the invention will become apparent upon reading the following detailed description and upon reference to the drawings, in which.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Figure 1:
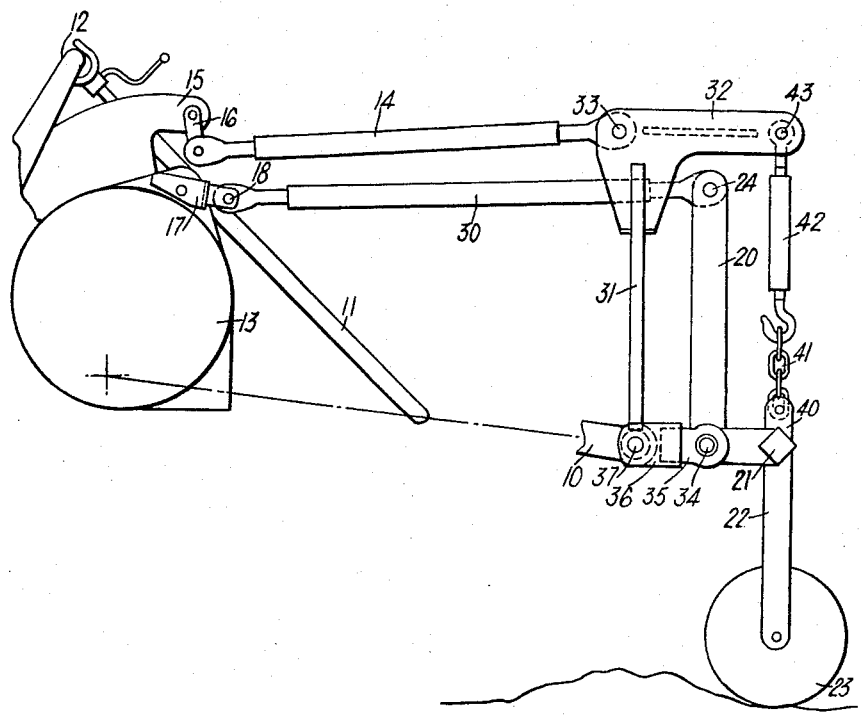
FIGURE 1 is a fragmentary side elevation of a tractor and implement coupled by a hitch mechanism embodying the present invention.
Figure 2:
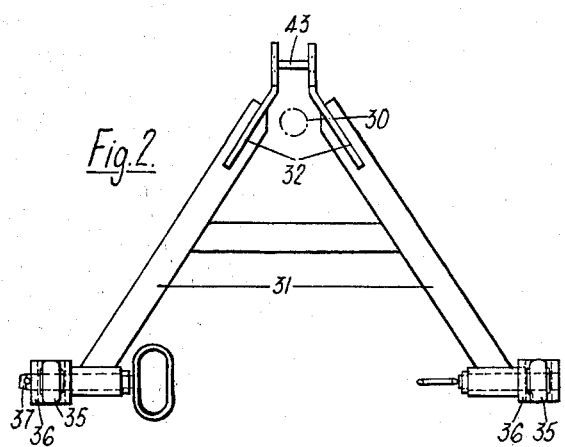
FIG. 2 is an end elevation of a portion of the hitch mechanism shown in FIG. 2.
Figure 3:
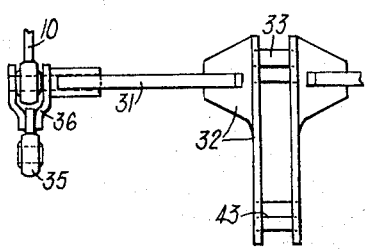
FIG. 3 is a fragmentary plan view of the mechanism shown in FIG. 2.

Turning now to FIG. 1, there is shown a hitch mechanism for coupling an implement to the rear end of a tractor, which is only fragmentarily shown. The hitch mechanism includes a lower pair of trailing draft links 10 supported by a power lift including drop links 11 carried by arms 12, only one each of these elements being shown in this side elevation. The arms 12 are secured to opposite ends of a transverse rockshaft which is journalled in the body 13 of the tractor and is turnable by an hydraulic ram, not shown.

Preferably, the power lift arms are coupled to an automatic draft control which those familiar with the art will associate with the well-known "Ferguson system." The hitch mechanism also includes an upper draft control link 14 that is connected to a bracket 15 on the tractor body 13 by a suspensory shackle 16. Fore-and-aft shifting movement of the control link 14 serves to operate the automatic draft control mechanism in the well-known manner. For example, when a plow is drawn by the tractor, the upper draft control link 14 is under compression. If the compression increases, the power lift swings the arms 12 counterclockwise so as to raise the draft links 10 until equilibrium conditions are regained. Conversely, if the compression in the control link 14 decreases, the arms 12 swing clockwise to permit the draft links 10 to fall correspondingly. Similarly, if an implement normally places the upper link in tension, the automatic draft control would raise the draft links 10 upon a decrease in tension and lower the links upon an increase in tension.

The tractor body 13 is also formed with a bracket 17 which carries a so-called long hitch pin 18.

The representative impelement illustrated includes a main frame formed as an upright A-bracket 20 carrying a cross beam 21 to which one or more earth working tools can be secured. The implement is wheel supported and a strut 22 extends downwardly from the cross beam 21 to rotatably support a ground engaging wheel 23. The upper end of the A-bracket 20 is provided with a pivot 24 for receiving a tractor hitch link. Normally, of course, the upper control link 14 would be secured to the pivot 24 but, in keeping with the present invention, a stabilizing link 30 is extended from the pivot 24 to the long hitch pin 18.

Further in keeping with the invention, an auxiliary frame comprising an A-bracket 31 is mounted on the draft and control links 10, 14 of the tractor. The upper end of the bracket 31 carries a pair of laterally spaced members 32 to the front of which the top link 14 is pivotally attached by a pin 33. At the feet of the A-bracket 31, a pair of coaxial, laterally spaced pivot pins 37 pivotally couple the draft links 10, the lower portion of the auxiliary frame bracket 31, and the front ends 36 of a pair of intermediate links whose rear ends 35 are pivoted to the feet of the implement bracket 20 by a pair of lateral pivot pins 34. The auxiliary frame bracket 31 is thus supported on the draft and control links 10, 14 while the implement bracket 20, through the intermediate links 35, 36, is floatingly carried on the auxiliary frame.

The members 32 extend rearwardly above the implement beam 21 and they are coupled thereto by a substantially vertical, contractible tie which, in the illustrated embodiment, includes a chain 41 extending between a lug 40 on the beam 21 and a turnbuckle 42 that is anchored by a pin 43 between the members 32. The turnbuckle 42 permits adjustment of the length of the tie. It can thus be seen that the weight of the implement can be proportioned between the implement supporting wheel 23 and the tractor by tensioning the tie turnbuckle 42. The weight of the implement, acting through the chain and turnbuckle 41, 42, tends to place the upper link in tension.

In operation, when the tractor-implement combination works over undulating ground, the implement frame 20, 21 rises and falls relative to the draft links 10, this motion being permitted by the links 35, 36 which pivot upwardly and downwardly about the pins 37. With this up and down movement, the stabilizing link 30 maintains the implement frame at the appropriate attitude with respect to the ground. Whenever the implement frame is forced to rise, the tie chain 41 slackens so as to reduce the tension in the upper link 14 with the result that the automatic draft control causes the power lift to raise the draft links 10, and, with them, the auxiliary frame 31, 32 until equilibrium conditions are restored. Conversely, when the ground falls from beneath the wheel 23, increased tension created in the top link by the weight of the implement being supported solely, or more completely, by the power lift, causes the draft links 10 to be lowered and the implement lowers with them until the wheel 23 again contacts the ground and transfers a portion of the implement weight thereto.

It can thus be seen that the hitch mechanism of the invention is effective to transfer a portion of the weight of a wheeled implement from the supporting wheels to the tractor to which the implement is coupled. This permits the operation of very heavy implements with a relatively light tractor while retaining the Ferguson system of draft control operation. By having at least a portion of the implement weight supported directly by the ground, the implement follows ground undulations easily.

While the above discussion was concerned with an "implement" it will be readily apparent that a wheeled trailer of the single axle or two-wheeled type can be advantageously utilized with the hitch mechanism of the present invention. Through the above disclosed hitch mechanism, a portion of the trailer weight is transferred to the tractor so that a relatively light tractor can utilize its full power potential in pulling a heavy trailer load without rear wheel slippage.

It will furthermore be appreciated that the division of weight between the tractor and the supporting wheels of an implement permits draft control operation without concentrating all of the implement weight and "suck" to the tractor wheels where excessive ground compaction could occur.

In the following claims, it will be understood that the term "implement" should be taken to include any trailer type of structure as well as a ground working device.

I claim as my invention:

1. In combination with a tractor and a wheel supported implement, a hitch mechanism comprising, a pair of trailing draft links on said tractor, an upper control link connected to said tractor above said draft links, an auxiliary frame pivoted on said draft links and said control link for up and down movement therewith, means including an auxiliary link pivoted at one end to said auxiliary frame and at the other end to said implement so as to mount said implement on said auxiliary frame for up and down floating movement relative thereto, a stabilizing link pivotally connected to said tractor and directly to said implement at a point spaced from the pivotal connection between said auxiliary link and said implement for substantially maintaining the angular disposition of said implement as it floats on said auxiliary frame, and substantially vertical tie coupling said implement and the upper portion of said auxiliary frame so as to tension said control link and transfer a portion of the implement weight from said implement wheel to said tractor.

2. In combination with a tractor and a wheel supported implement, a hitch mechanism comprising, a pair of trailing draft links on said tractor, an upper control link connected to said tractor above said draft links, means on said tractor for raising said draft links, an auxiliary A-frame having its lower ends pivoted on said draft links and its upper end pivoted to said control link for up and down movement therewith, means including an auxiliary link pivoted at one end to said auxiliary frame and at the other end to said implement so as to mount said implement on said auxiliary frame for up and down floating movement relative thereto, a stabilizing link pivotally connected to said tractor and directly to said implement at a point spaced from the pivotal connection between said auxiliary link and said implement for susbtantially maintaining the angular disposition of said implement as it floats on said auxiliary frame, and a flexible, adjustable length tie coupling said implement and the upper portion of said auxiliary frame so as to tension said control link and transfer a portion of the implement weight from said implement wheel to said tractor.

3. A hitch arrangement for a tractor comprising, in combination, a pair of trailing draft links pivoted on said tractor, a draft control link connected to said tractor above said draft links, an auxiliary frame having its lower end pivoted to said draft links and its upper end pivoted to said control link, a pair of intermediate links pivoted on said auxiliary frame in approximate alinement with said draft links, an upstanding wheel supported implement frame pivoted on the free ends of said intermediate links, a stabilizing link pivotally connected adjacent one end to said tractor and adjacent its opposite end to the upper portion of said implement frame at a point spaced from the pivotal connection of said implement frame and said intermediate links so as to maintain the angular disposition of said implement frame relative to said auxiliary frame, and a substantially vertical tie coupling the lower portion of said implement frame and the upper end of said auxiliary frame so as to tension said control link and transfer a portion of the implement frame weight from said wheel to said tractor.

4. A hitch arrangement for a tractor comprising, in combination, a pair of trailing draft links pivoted on said tractor, means for raising and lowering said draft links, a draft control link connected to said tractor above said draft links, an auxiliary A-frame having its lower ends pivoted respectively to said draft links and its upper end pivoted to said control link, a pair of intermediate links pivoted on said auxiliary frame in approximate alinement with said draft links, an upstanding wheel supported implement frame pivoted on the free ends of said intermediate links, a stabilizing link pivotally connected adjacent one end to said tractor and adjacent its opposite end to the upper portion of said implement frame at a point spaced from the pivotal connection of said implement frame and said intermediate links so as to maintain the angular disposition of said implement frame relative to said auxiliary frame, and a substantially vertical, flexible tie coupling the lower portion of said implement frame and the upper end of said auxiliary frame so as to tension said control link and transfer a portion of the implement frame weight from said wheel to said tractor, said tie being adjustable in length so as to regulate the transfer of implement frame weight.

References Cited by the Examiner

UNITED STATES PATENTS

| | | | |
|---|---|---|---|
| 2,456,693 | 12/48 | Fraga | 172—448 X |
| 2,663,239 | 12/53 | Rapp et al. | 172—448 X |
| 2,695,577 | 11/54 | Webster | 172—439 X |
| 2,907,394 | 10/59 | Cook | 172—7 |
| 3,013,350 | 12/61 | Fox | 172—439 |

ABRAHAM G. STONE, *Primary Examiner.*

A. JOSEPH GOLDBERG, *Examiner.*